(12) United States Patent
Ambilkar et al.

(10) Patent No.: US 7,093,254 B2
(45) Date of Patent: Aug. 15, 2006

(54) SCHEDULING TASKS QUICKLY IN A SEQUENTIAL ORDER

(75) Inventors: Shridhar N. Ambilkar, Bangalore, IN (US); Girish Gopala Kurup, Bangalore, IN (US); Ashutosh Misra, Bangalore, IN (US)

(73) Assignee: International Business Machines Corporation, Armonk, NY (US)

( * ) Notice: Subject to any disclaimer, the term of this patent is extended or adjusted under 35 U.S.C. 154(b) by 596 days.

(21) Appl. No.: 10/114,724

(22) Filed: Apr. 1, 2002

(65) Prior Publication Data

US 2003/0187905 A1   Oct. 2, 2003

(51) Int. Cl.
*G06F 9/44* (2006.01)

(52) U.S. Cl. .................................. 718/102
(58) Field of Classification Search ......... 718/100–108
See application file for complete search history.

(56) References Cited

U.S. PATENT DOCUMENTS

| 5,448,735 | A | * | 9/1995 | Anderson et al. ........... 718/100 |
| 5,530,861 | A | * | 6/1996 | Diamant et al. ............... 705/8 |
| 5,630,128 | A | * | 5/1997 | Farrell et al. ............... 718/103 |
| 6,304,891 | B1 | * | 10/2001 | Anderson et al. .......... 718/107 |
| 6,854,116 | B1 | * | 2/2005 | Anderson et al. .......... 718/100 |

* cited by examiner

*Primary Examiner*—Lewis A. Bullock, Jr.
(74) *Attorney, Agent, or Firm*—Anthony V S England; T. Rao Coca (57) ABSTRACT

Scheduling a sequence of tasks quickly using a task list containing a sequence of entries, with each entry indicating whether a task is enabled or disabled for execution. A scheduler block examines the sequence of entries without wasting time in examining entries between those (entries) related to a prior scheduled task and a task to be scheduled next. By not wasting time examining the entries related to the disabled entries, the next task in the sequence of tasks may be scheduled for execution quickly.

15 Claims, 6 Drawing Sheets

SCHEDULING TASKS QUICKLY IN A SEQUENTIAL ORDER

BACKGROUND OF THE INVENTION

1. Field of the Invention

The present invention relates to data processing systems, and more specifically to a method and apparatus for scheduling tasks quickly in a sequential order.

2. Related Art

Data processing systems are often used to execute user applications (e.g., word processor, spreadsheets, distributed computing, etc). Applications in turn are often supported by multiple tasks. A task is generally implemented in the form of one or more instructions to provide a corresponding utility. Examples of tasks include transferring a segment of data from one memory unit to another and performing complex instructions.

Multiple tasks often need to be executed to support user applications. In general, the tasks often need to share resources such as processors, memories and interconnecting buses for execution. At least due to availability of only limited resources, only some of the tasks can generally be executed in parallel at a given time. Accordingly, data processing systems often include schedulers which coordinate and control execution of the tasks.

Schedulers typically need to be implemented meeting or balancing various requirements. One requirement is that the next task to be executed be determined quickly. In addition, it may be required to suspend a first task after partial execution, execute a second task and then switch back to the execution of the first task.

What is therefore needed is a method and apparatus for scheduling tasks meeting one or more requirements such as those noted above.

SUMMARY OF THE INVENTION

A scheduler in accordance with the present invention schedules a sequence of tasks quickly. In an embodiment, a task list is maintained associated with a sequence of tasks. The task list contains a sequence of entries, with each entry indicating whether a corresponding task is enabled or disabled for execution. The scheduler determines a next task (after a present task) to be executed without wasting time examining the corresponding entries between those related to the present task and the next task.

In one implementation, the sequence of tasks are executed in multiple iterations. A master task list is used to indicate whether the execution of each task is complete or not. A shadow task list is maintained indicating whether each enabled task has been executed or not in a present iteration. Thus, the shadow task list may be generated by copying the master task list at the beginning of each iteration.

Each entry in the shadow task list is disabled (cleared or set to 0) when the corresponding task is scheduled for execution. Thus, when all the entries in a shadow task list are cleared, a next iteration may be started. Each entry in the master task list may be cleared when the execution of the corresponding task is complete.

In an embodiment, each task corresponds to transferring data from one segment of a memory to another. In an alternative embodiment, the sequence of tasks correspond to a set of micro-instructions used to execute machine instructions. A (master) task list is associated with each machine instruction, with the task list indicating the micro-instructions which need to be executed to perform the machine instruction.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein.

DETAILED DESCRIPTION OF THE PREFERRED EMBODIMENTS

1. Overview and Discussion of the Invention

According to an aspect of the present invention, a task list is maintained associated with a sequence of tasks which would need to be scheduled in a sequential order. The task list indicates whether each task is enabled (need to be executed) or disabled for execution. A method and/or apparatus may be implemented to quickly schedule one enabled task after the another enabled task in sequential order while minimizing the time consumed. In an embodiment, the scheduling may be performed in a single clock cycle.

Due to such quick scheduling, the overall throughput performance of a data processing system may be enhanced. The advantages of the present invention can be appreciated by first understanding the additional time taken while implementing an example prior approach. Accordingly, the example prior approach is described first.

2. Prior Approach

Figure 1:
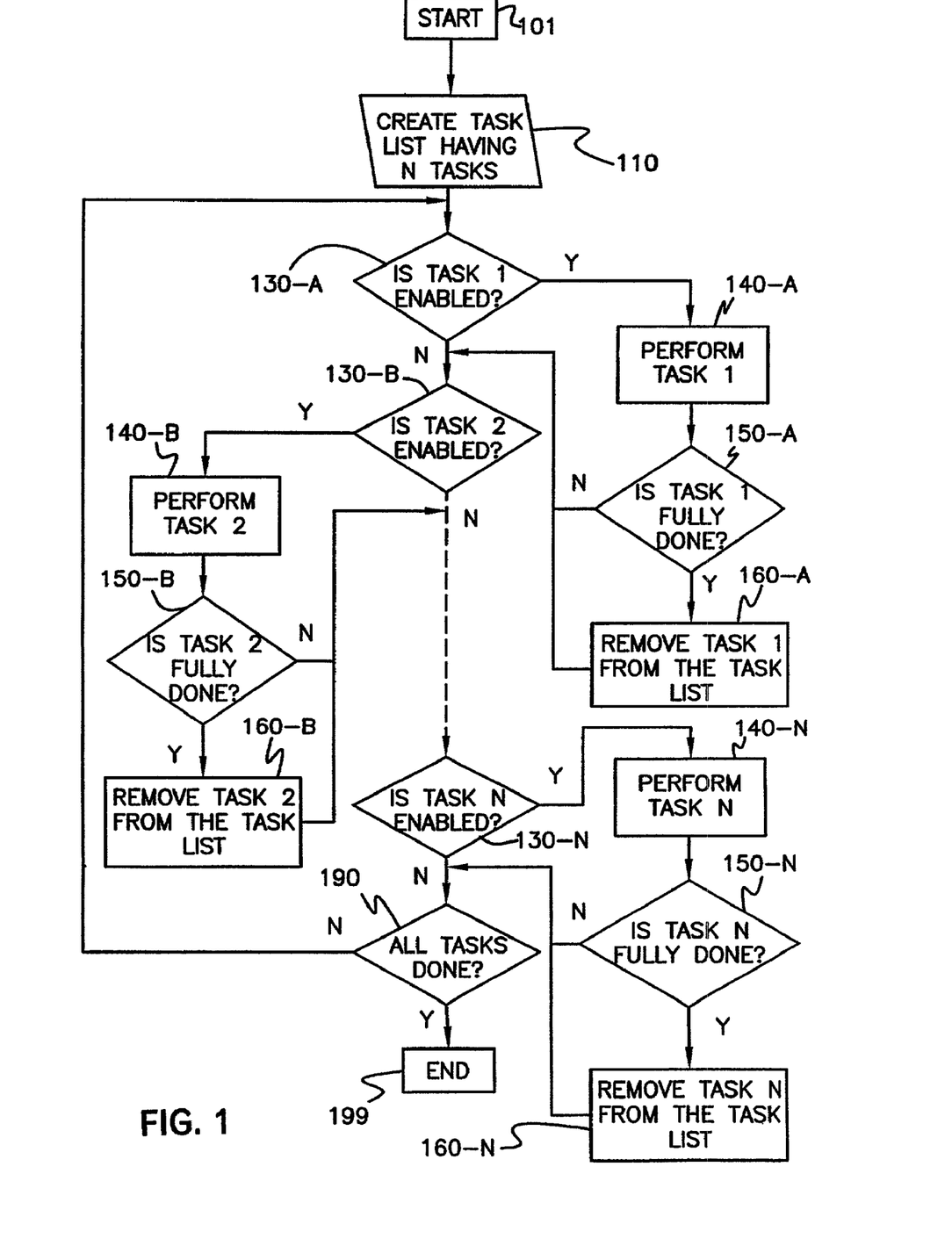
FIG. 1 is a flow chart illustrating a prior approach used to schedule tasks in a sequential order.

FIG. 1 is a flow chart illustrating a prior approach used to schedule a sequence of tasks in a sequential order. The method begins in step 101, in which control immediately passes to step 110.

In step 110, a task list is created for a sequence of tasks which need to be executed sequentially. The task list indicates whether each task in the sequence is enabled or disabled. In one embodiment, the task list contains a number of bits equal to the number of tasks, and each bit indicates whether the corresponding task is enabled or disabled for execution. The bits may be contained in units such as bytes or words, which are suitable for fast transfers and storing in high speed units such as registers.

In step 130-A, a determination is made as to whether the first task in the sequence of tasks is enabled or disabled. If the first task is enabled, control passes to step 140-A and to step 130-B otherwise. In step 140-A, the first task in the sequence of tasks is executed. Execution continues usually until preempted for scheduling of other tasks or when execution of the first task is completed.

In step 150-A, a determination is made as to whether the first task is executed completely. If the task is completed, control passes to step 160-A else the control passes to step 130-B. In step 160-A, the first task is disabled in the task list as the execution is complete. Control may then pass to step 130-B.

Steps 130-B, 140-B, 150-B and 160-B may be performed similar to steps 130-A, 140-A, 150-A and 160-A respectively, but with reference to the second task (instead of the first task). It may be appreciated that similar four steps may be performed associated with each of the tasks represented in the task list. FIG. 1 represents a situation in which N tasks are represented by the task list.

In step 190, a determination is performed as to whether execution of all tasks are complete by examining the task list. If any of the tasks are not executed completely, control passes to step 130-A or else control passes to step 199 in which the method ends. Execution of the four steps related to the N tasks continues potentially in multiple iterations until all the tasks represented by the task list are complete.

As may be appreciated from the above approach, the scheduler examines the task list entry for each task in the sequence, even if the task is disabled. That is, steps 130-A through 130-N would be executed in each iteration irrespective of whether the corresponding task is enabled or disabled. As a result, considerable time (clock cycles) may be wasted which could in turn minimize the throughput performance of a data processing system.

For example, assuming that tasks 2 and 14 are enabled and tasks 3-13 are disabled, scheduling task 14 after performing task 2 in an iteration, may consume 12 clock cycles, assuming a clock cycle is consumed to perform each of the steps 130-C through 130-14. Accordingly, a method to reduce such time wasted is described below.

3. Method

Figure 2:
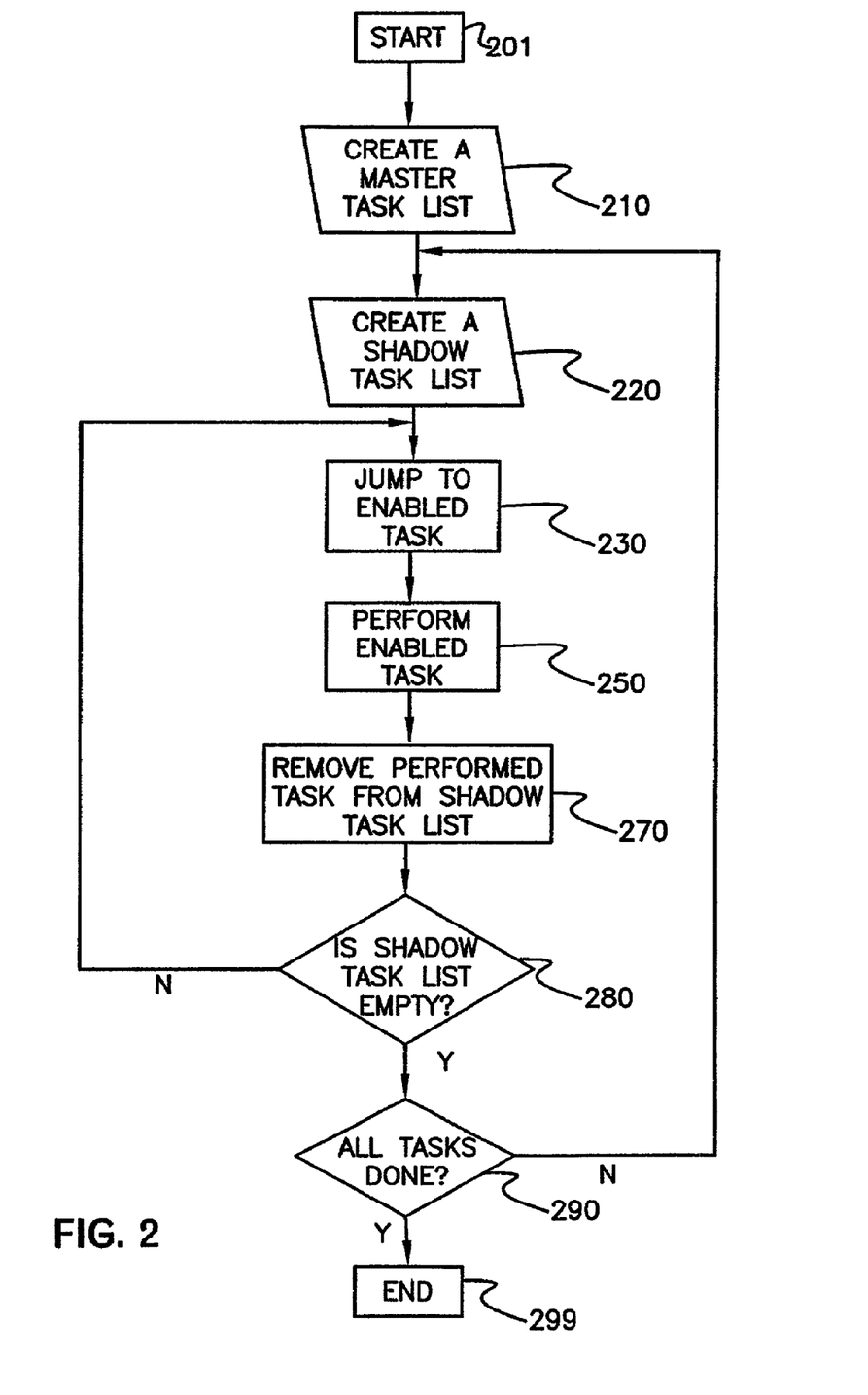
FIG. 2 is a flow chart illustrating a method to quickly schedule tasks in a sequential order according to an aspect of the present invention.

FIG. 2 is a flow-chart illustrating a method using which a sequence of tasks can be quickly scheduled in sequential order. The method begins in step 201, in which control immediately passes to step 210.

In step 210, a master task list is created for a sequence of tasks which need to be executed sequentially. The master task list indicates whether each task in the sequence is enabled or disabled. An embodiment of the master task list contains a number of bits equal to the number of tasks (in the sequence), and each bit indicates whether the corresponding task is enabled or disabled for execution. The bits may be contained in units such as bytes or words, which are suitable for fast transfers and for storing in high speed units such as registers.

In step 220, a shadow task list is created by copying the master task list. When created, the shadow task list may contain the same information as that present in the master task list. As described below, the shadow task list is used to maintain information indicating the list of enabled tasks not yet executed in each iteration (of steps 230–280).

In step 230, the scheduler schedules a next one of the sequence of tasks without wasting clock cycles in examining the task list entries corresponding to the disabled tasks. In other words, examination of the entries corresponding to the disabled tasks are skipped by the scheduler, thereby reducing the total time consumed when scheduling a sequence of tasks.

In step 250, the scheduled task is executed. In step 270, the executed task is indicated to be disabled in the shadow task list. If the execution of the task is complete, executed task is indicated to be disabled in the master task list also.

In step 280, the shadow task list is examined to determine whether any of the sequence of tasks is indicated to be enabled. If any tasks are indicated to be enabled, control passes to step 230. Steps 230–280 are repeated until shadow task list indicates that all the tasks are disabled. When the shadow task list is empty, control passes to step 290.

In step 290, a determination is made as to whether all the enabled tasks in the sequence of tasks are completely executed. The determination may be made by checking the master task list. If the master task list indicates that all the tasks are disabled, execution of all tasks may be deemed to be complete. If any of the tasks are indicated to be enabled, control passes to step 220. Steps 230–290 are repeated with the new shadow task list generated in step 220.

Even though the master task list and shadow task list are described as being separate data structures, it should be understood that the two lists can be combined into a single list (with entry for each task containing more than one bit). Such alternative implementations will be apparent to one skilled in the relevant arts based on the disclosure provided herein, and are intended to be covered by several aspects of the present invention.

Thus, a sequence of tasks can be scheduled and executed using a method in accordance with FIG. 2. The throughput performance of a data processing system (using the method of FIG. 2) may be enhanced as a next enabled task (in the sequence of tasks) can be scheduled without wasting clock cycles examining any disabled tasks between the prior executed task and the next enabled task (in the sequence of tasks). Partial execution of tasks is also supported by using a shadow task list. The description is continued with reference to an example embodiment which can be used to implement the method of FIG. 2.

4. Scheduling Block

Figure 3:
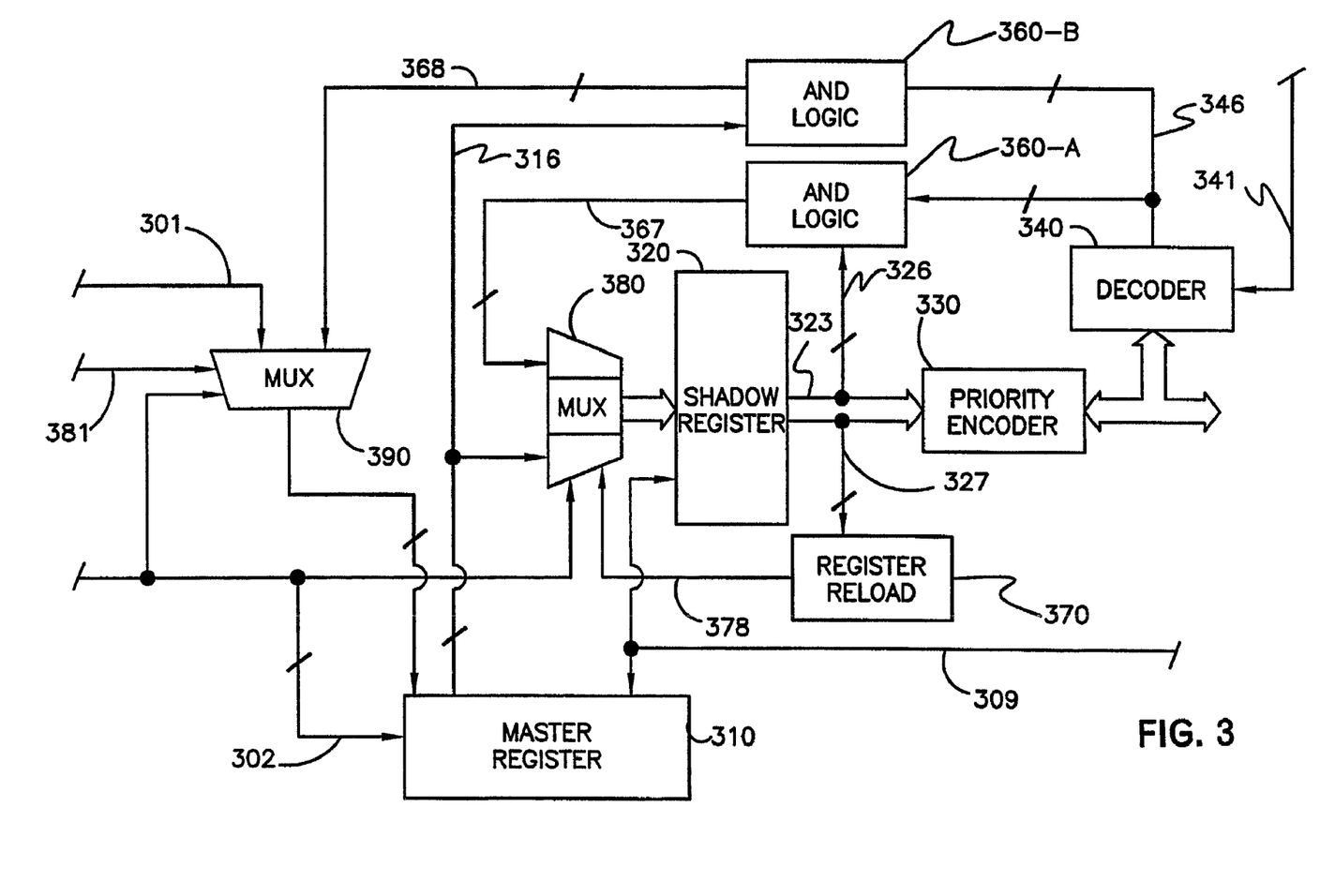
FIG. 3 is a block diagram illustrating the details of an embodiment of a scheduling block implemented in accordance with the present invention.

FIG. 3 is a block diagram illustrating the details of an embodiment of scheduling block 300 implemented in accordance with an aspect of the present invention. Scheduling block 300 is shown containing master register 310, shadow register 320, priority encoder 330, decoder 340, AND logic block 360-A and 360-B, register reload block 370, multiplexor 380 and 390. Each block is described in further detail below.

Master register 310 stores a master task list which indicates whether each task (in a sequence of tasks) is presently enabled or disabled for execution. In an embodiment, the master task list contains a number of bits equal to the number of tasks in the sequence, with each bit indicating whether the corresponding task is enabled or disabled (including completion of execution) for execution. The master task list maybe initially received on path 301 via multiplexor 380 when signal 302 is asserted. Once the execution of a task is complete, the entry in the master task list corresponding to the completed task is indicated to be disabled. Thus, the master task list indicates the enabled tasks yet to complete execution. The remaining components operate as an examination circuit to schedule the enabled tasks in sequence according to the master task list.

Shadow register 320 stores a shadow task list which indicates the sequence of tasks which are yet to be executed in each iteration. At the beginning of each iteration, shadow register 320 may be loaded with the master task list present in master register 310 via multiplexor 380 (by register reload 370). As will be described below, each task is executed for some time (determined externally) or until completion of execution, and the bit in the shadow task list corresponding to the task just executed is disabled (set to 0). When all the bits in shadow task list 320 equal 0, and master task list still indicates that some tasks are incomplete, shadow register 320 is reloaded with master task list (which now contains bits indicating only incomplete and enabled tasks).

Priority encoder 330 examines the shadow task list received on path 323, and generates a task number representing the next task to be executed. As each bit of the shadow task list indicates whether the corresponding task is enabled for execution, priority encoder 330 generates the task number equaling the bit position (with least significant bit treated as position 1) of the first enabled bit (or corresponding task).

For example, if shadow task list contains bits (1000 0010), priority encoder 330 generates task number equal to 2 first reflecting that task number 2 (corresponding to bit position 2) is to be executed first. Once task 2 is executed, the second bit is set to 0, and a task number of 8 is generated reflecting that task number 8 (corresponding to bit position 8) is to be executed. If a mask list contains $2^n$ bits, priority decoder 330 may merely need 'n' bits to represent the task number.

Decoder 340 converts the 'n'-bit number generated by priority encoder into a $2^n$-bit number, with the bit in the position corresponding to the task number equal to zero and the remaining bits equal to 1. In effect, priority encoder 330 and decoder 340 operate to generate a number, which contains a 0 in the position corresponding to the task to be scheduled for execution, and 1 in the remaining of the $2^n$ bit positions.

Continuing with reference to the previous example, when priority encoder 330 generates task number equal to 2, decoder 340 generates '1111 1101'. A zero in the second bit position indicates that the task number 2 is scheduled for execution. When priority encoder 330 generates task number 8, decoder 340 generates '0111 1111'.

Decoder 340 forwards the generated value to AND logic 360-B when a clear signal is received on line 341. Clear signal 341, when asserted, indicates the end of execution of a scheduled task. The end may occur either because of completion of execution of a task or lapse of time allocated for execution of the task.

AND logic block 360-A performs a logical AND operation on output of decoder 340 on bus 346 and the bits in shadow task list received on bus 326. AND logic block 360-A thus generates a value with the same bit values as in the shadow task list except that the bit corresponding to the task just executed would be set equal to a zero (disabled). Thus, when one iteration is completed all the bits in shadow task list should equal zero, i.e., all enabled tasks have been executed at least once.

Register reload block 370 causes the master task list in master register 310 to be copied into shadow register 320 at the end of each iteration. Register reload block 370 may examine the shadow task list for a zero value, and generate a logic high level on register reload signal 378 when a zero value is detected.

The logic high value causes multiplexor 380 to select the master task list, and the selected value is stored in shadow register 320. Thus, the entry corresponding to an executed task is cleared in shadow register 320. The components of above which cause the clearing operation to be performed, may together be referred to as clearing circuit.

Multiplexor 380 selects master task list stored in master register 310 when register reload signal on line 378 is asserted (logic high), the output on bus 367 when signal 378 is asserted by register reload 370. The bits on bus 367 are selected after execution of each task in an iteration. The master task list is selected at the beginning of each iteration.

AND logic block 360-B performs a logical AND operation on value on bus 346 and the bits in master task list received on bus 316. AND logic block 360-B generates a value with the same bit values as in the master task list but with the bit in the position corresponding to the task just executed to zero. As described below, if the task is completely executed, the output of AND logic block 360-B is stored in master register 310.

Multiplexor 390 selects value on bus 368 (for loading into master register 310) when execution complete signal on line 381 is asserted, and the value on bus 301 when initial load signal 302 is asserted. Initial load signal 302 is asserted during initialization when a sequence of tasks are to be scheduled using scheduler 300. Once master register 310 is initialized with a master task list, the components operate to schedule the enabled tasks in sequence as described above.

By not consuming time for examining the data related to disabled tasks (in a sequence of tasks), the time consumed to schedule the enabled tasks may be reduced. The description is continued with reference to a timing diagram which illustrates the time that can be saved in an embodiment described above.

5. Timing Diagram

Figure 4:
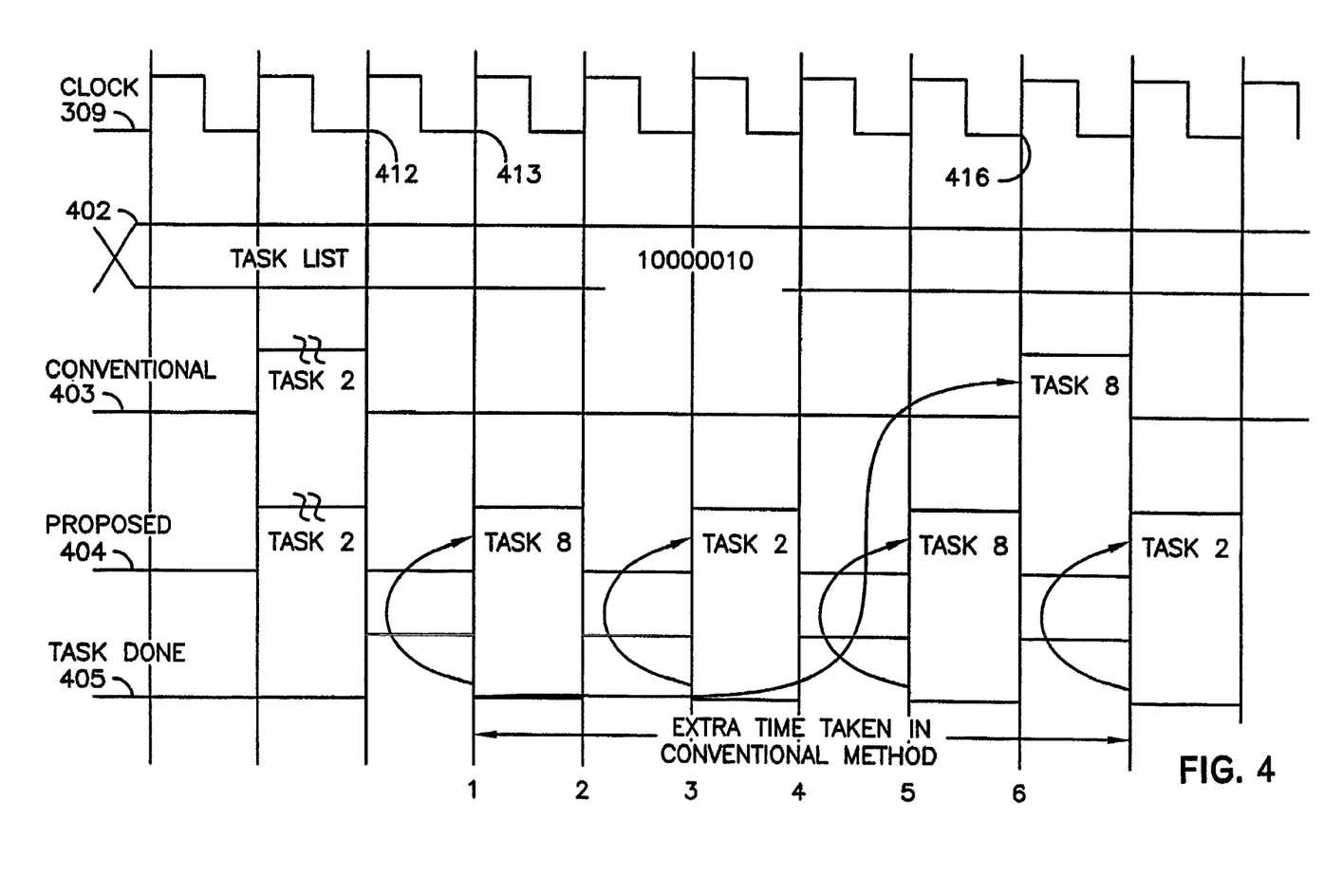
FIG. 4 is a timing diagram illustrating the extra time consumed by the prior approach as compared with the present invention.

FIG. 4 is a timing diagram illustrating the reduction in time (compared to a prior approach described above) consumed using an approach according to the present invention. The two methods have been compared for an example task list executed with reference to an example clock signal shown on line 309. The task list contains a bit stream '1000010'. That is, task 2 (second least significant bit) and task 8 (most significant bit) are enabled.

FIG. 4 is shown containing clock signal 309, task list 402, signal 403 illustrating time taken by prior approach, signal 404 illustrating time taken by present approach, signal 405 indicating that a task has been executed. In both approaches, task 2 is shown ending at time point 412.

In the prior approach, execution of task 8 is shown starting at time point 416 whereas in the present approach execution of task 8 is shown starting at time point 413. As is seen on signal 405, in the present approach, task 8 is executed immediately after signal 405 goes high (between points 412 and 413) after completion of task 2 whereas in the prior approach task 8 begins execution only at point 416.

As is seen in FIG. 4, the prior approach takes 6 extra clock cycles when traversing from end of task 2 to beginning of task 8 whereas the present approach takes just a clock cycle when traversing from end of task 2 to start of task 8. Thus, the present invention consumes less time when traversing among tasks. The description is continued with reference to an example environment in which the present invention can be implemented.

6. Example Environment

Figure 5:
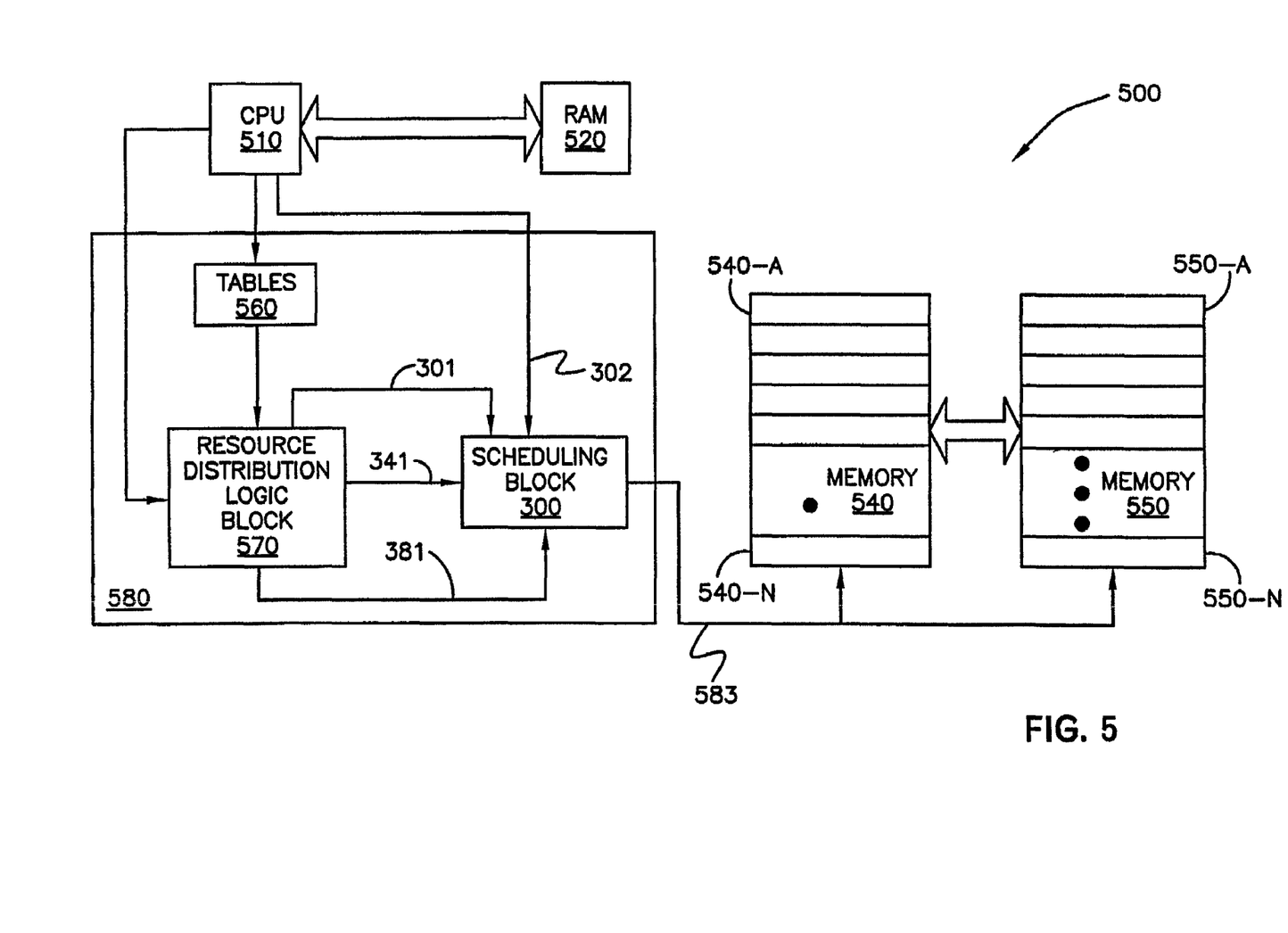
FIG. 5 is a block diagram illustrating an example environment in which the present invention can be implemented.

FIG. 5 is a block diagram illustrating the details of data processing system 500 in which the present invention can be implemented. Data processing system 500 is shown containing central processing unit (CPU) 510, random access memory (RAM) 520, memory units 540 and 550 and direct memory access (DMA) controller 580. Each component is described in further detail below.

CPU 510 may execute instructions stored in RAM 520 to provide several features of data processing system 500. CPU 510 may contain one or more individual processors. One or more of the instructions may be used to transfer data in segments of memory unit 540 to memory unit 550. The manner in which the data transfer may be performed is described below.

Memory unit 540 is shown containing segments 540-A through 540-N and memory unit 550 is shown containing segments 550-A through 550-N. In some situations, it may be required to transfer data contained in the segments of memory 540 to memory 550 (or vice versa). It may not be required to transfer all of the segments for particular applications. DMA controller 580 controls such data transfer between memories. The transfer of data related to each segment may be characterized as a task. DMA controller 580 may be set up to cause the tasks to be performed as described below.

DMA controller 580 (an example of a controller) is shown containing tables 560, resource distribution logic 570 and scheduling block 300. Tables 560 contain various scheduling parameters such as the time to be allocated for execution of each task in each iteration. Tables 560 may also contain information on which segments in memory 540 (or 550) have to be transferred for a particular task.

Resource distribution logic 570 provides scheduling block 300 with a task list representing the segments of the memory required to be transferred. Each bit corresponding to a segment requiring transfer may be set to a 1 and the remaining bits may be set to 0. Resource distribution logic 570 generates clear signal on line 341 when time allocated (determined based on tables 560) for a task has elapsed.

Resource distribution logic 570 asserts master clear signal 381 when the task has been completely executed. Scheduling block 300 generates signal 583 which controls the transfer of segments between memory units 540 and 550. The operation of scheduling block 300 is as described in the previous sections.

Thus, a feature of the present invention allows data transfers to be performed efficiently in a data processing system. It must be appreciated the present invention can be implemented to achieve other utilities as well. For example, the present invention may be used to execute machine instructions as described below.

7. Executing Machine Instructions

The present invention may be implemented to execute machine instructions (having a one-to-one correspondence with assembly level language). As is well known, a machine instruction may be implemented by executing a sequence of micro-instructions according to micro-code. Each instruction may be executed using micro-instructions as described below.

A task list, containing a number of bits equal to the number of micro-instructions may be maintained. Only the micro-instructions which need to be executed may be enabled in the corresponding task list. As may be appreciated, a task list may be associated with each instruction, and the tasks may be scheduled for execution when the corresponding instruction has to be executed. Scheduler 300 may be used to schedule the tasks.

However, it may be necessary to execute tasks in a different sequence than the sequence specified in a task list. For example, it may be required to execute micro-instructions 1, 6 and 3 in that sequence, to execute an instruction. In such a situation, the instruction may be executed using two task lists, with the first task list specifying 1 and 6, and the second task list specifying 3.

It may be appreciated that even though the above embodiments are described with respect to hardware, alternative embodiments may be implemented substantially in software. The manner in which data processing system can be implemented in software is described below.

8. Software Implementation

Figure 6:
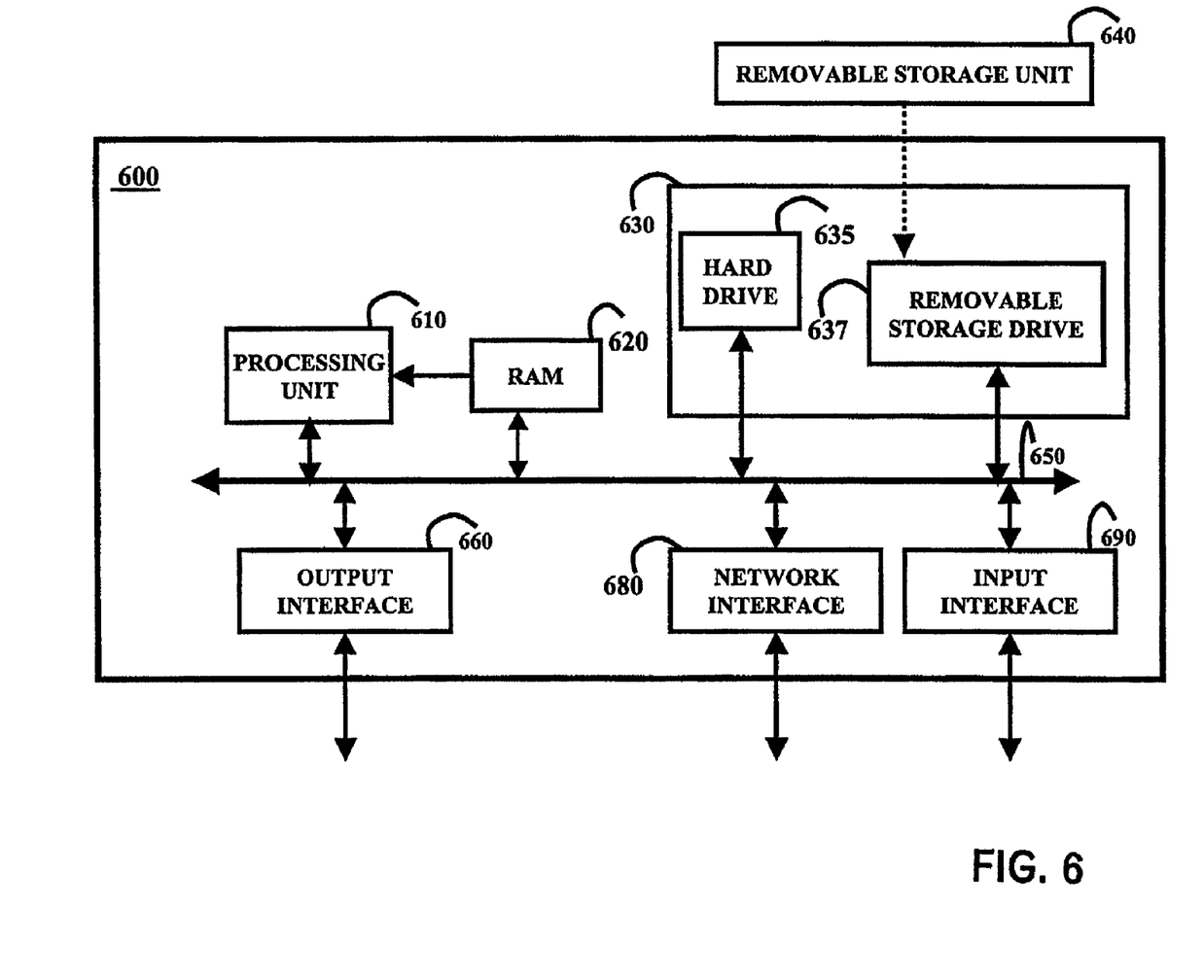
FIG. 6 is a block diagram illustrating an embodiment of the present invention implemented substantially in the form of software.

FIG. 6 is a block diagram illustrating the details of data processing system 600. Data processing system 600 is shown containing processing unit 610, random access memory (RAM) 620, storage 630, output interface 660, network interface 680 and input interface 690. Each component is described in further detail below.

Output interface 660 provides output signals (e.g., display signals to a display unit, not shown) which can form the basis for a suitable user interface for a user to interact with data processing system 600. Input interface 690 (e.g., interface with a key-board and/or mouse, not shown) enables a user to provide any necessary inputs to data processing system 600.

Output interface 660 and input interface 690 can be used, for example, to enable a user to interact with data processing system 600. For example, a user may provide the inputs required to execute machine instructions using input interface 690 and the corresponding result may be viewed on a display unit (not shown) using output interface 660. In addition, the various parameters stored tables 540 may also be provided using input interface 690 and output interface 660.

Network interface 680 enables data processing system 600 to send and receive data on communication networks using protocols such as internet protocol (IP). Network interface 680, output interface 660 and input interface 690 can be implemented in a known way.

RAM 620 and storage (secondary memory) 630 may together be referred to as a memory. RAM 620 receives instructions and data on path 650 from storage 630, and provides the instructions to processing unit 610 for execution. In addition, RAM 620 may be used to store the tasks which are required to be scheduled.

Secondary memory 630 may contain units such as hard drive 635 and removable storage drive 637. Secondary storage 630 may store the software instructions and data, which enable data processing system 600 to provide several features in accordance with the present invention.

Some or all of the data and instructions may be provided on removable storage unit 640, and the data and instructions may be read and provided by removable storage drive 637 to processing unit 610. Floppy drive, magnetic tape drive, CD-ROM drive, DVD Drive, Flash memory, removable memory chip (PCMCIA Card, EPROM) are examples of such removable storage drive 637.

Processing unit 610 may contain one or more processors. In general processing unit 610 reads sequences of instructions from various types of memory medium (including RAM 620, storage 630 and removable storage unit 640), and executes the instructions to provide several features of the present invention as described above.

9. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A method in a computer system of scheduling a sequence of tasks for execution, wherein a computer program is stored on tangible media of a storage device of the computer system, said method comprising:
   reading the computer program from the storage device by computer system; and
   performing steps by the computer system responsive to the instructions of the computer program, the steps including:
   a) maintaining a master task list containing a sequence of entries for respective tasks, wherein each such entry indicates whether the respective entry's corresponding one of said tasks is enabled for execution or not, so that the master task list indicates ones of the entries enabled for execution and ones of the entries not enabled for execution;
   b) creating a first shadow task list from said master task list, wherein completed ones of the entries from the master task list are cleared from the first shadow task list;
   c) scheduling for execution a first one of the tasks in said first shadow task list, wherein the first shadow task list has a next one of the tasks immediately succeeding the first one of the tasks in said first shadow task list;
   d) scheduling for execution the immediately succeeding task in said first shadow task list, wherein the entry for the immediately succeeding task is not examined in the first shadow task list to determine whether said immediately succeeding task is enabled for execution; and e) repeating step d) for successive immediately succeeding ones of the task in the first shadow task list until the tasks for all the entries in the first shadow task list are scheduled, wherein said first shadow task list enables each one of the successive tasks to be scheduled more quickly than if the successive task entries in the first shadow task list were examined in the first shadow task list to determine whether the respective successive tasks were enabled for execution after scheduling each of said tasks; and e) executing said tasks, wherein said scheduling of each successive one of the tasks having entries on the shadow task list is performed after said scheduling for executing is begun for each respective preceding one of the tasks on the shadow task list.

2. The method of claim 1, further comprising disabling an entry corresponding to such a task in said master task list responsive to completion of execution of the task.

3. The method of claim 2, further comprising:
   creating a next shadow task list responsive to completing scheduling of all the tasks having entries in the first shadow task list, wherein completed ones of the entries from the master task list are cleared from the next shadow task list.

4. The method of claim 3, wherein tasks comprise transferring data from one memory unit to another.

5. The method of claim 3, wherein said tasks represent respective microinstructions, and wherein said master task list represents a plurality of microinstructions which need to be executed to execute a corresponding machine instruction.

6. An apparatus for scheduling a sequence of tasks for execution, said apparatus comprising:
   a processor;
   a storage device having stored, on a tangible media thereon, a computer program for controlling the processor, wherein the processor is operative to read the computer program from the media and perform steps responsive to instructions of the computer program, wherein the computer program includes;
   first instructions for performing a first step of maintaining a master task list containing a sequence of entries for respective tasks, wherein each such entry indicates whether the respective entry's corresponding one of said tasks is enabled for execution or not, so that the master task list indicates ones of the entries enabled for execution and ones of the entries not enabled for execution;
   second instructions for performing a second step of creating a first shadow task list from said master task list, wherein completed ones of the entries from the master task list are cleared from the first shadow task list;
   third instructions for performing a third step of scheduling for execution a first one of the tasks in said first shadow task list, wherein the first shadow task list has a next one of the tasks immediately succeeding the first one of the tasks in said first shadow task list;
   fourth instructions for performing a fourth step of scheduling for execution the immediately succeeding task in said first shadow task list, wherein the entry for the immediately succeeding task is not examined in the first shadow task list to determine whether said immediately succeeding task is enabled for execution; and
   fifth instructions for repeating the fourth step for successive immediately succeeding ones of the task in the first shadow task list until the tasks for all the entries in the first shadow task list are scheduled, wherein said first shadow task list enables each one of the successive tasks to be scheduled more quickly than if the successive task entries in the first shadow task list were examined in the first shadow task list to determine whether the respective successive tasks were enabled for execution after scheduling each of said tasks; and
   sixth instructions for executing said tasks, wherein said scheduling of each successive one of the tasks having entries on the shadow task list is performed after said scheduling for executing is begun for each respective preceding one of the tasks on the shadow task list.

7. The method of claim 6, wherein the computer program includes:
   instructions for disabling an entry corresponding to such a task in said master task list responsive to completion of execution of the task.

8. The apparatus of claim 6, comprising at least two memory units, wherein said tasks comprise transferring data from one of the memory units to another one of the memory units.

9. The apparatus of claim 6, wherein said tasks represent respective microinstructions, and wherein said master task list represents a plurality of microinstructions which need to be executed to execute a corresponding machine instruction.

10. The apparatus of claim 7, wherein the computer program includes:
    instructions for creating a next shadow task list responsive to completing scheduling of all the tasks having entries in the first shadow task list, wherein completed ones of the entries from the master task list are cleared from the next shadow task list.

11. A computer program product for scheduling a sequence of tasks for execution, wherein the computer program product resides on a tangible, computer usable medium having computer readable program code, the program code comprising:

first instructions for performing a first step of maintaining a master task list containing a sequence of entries for respective tasks, wherein each such entry indicates whether the respective entry's corresponding one of said tasks is enabled for execution or not, so tat the master task list indicates ones of the entries enabled for execution and ones of the entries not enabled for execution;

second instructions for performing a second step of creating a first shadow task list from said master task list, wherein completed ones of the entries from the master task list are cleared from the first shadow task list;

third instructions for performing a third step of scheduling for execution a first one of the tasks in said first shadow task list, wherein the first shadow task list has a next one of the tasks immediately succeeding the first one of the tasks in said first shadow task list;

fourth instructions for performing a fourth step of scheduling for execution the immediately succeeding task in said first shadow task list, wherein the entry for the immediately succeeding task is not examined in the first shadow task list to determine whether said immediately succeeding task is enabled for execution; and fifth instructions for repeating the fourth step for successive immediately succeeding ones of the task in the first shadow task list until the tasks for all the entries in the first shadow task list are scheduled, wherein said first shadow task list enables each one of the successive tasks to be scheduled more quickly than if the successive task entries in the first shadow task list were examined in the first shadow task list to determine whether the respective successive tasks were enabled for execution after scheduling each of said tasks; and sixth instructions for executing said tasks, wherein said scheduling of each successive one of the tasks having entries on the shadow task list is performed after said scheduling for executing is begun for each respective preceding one of the tasks on the shadow task list.

12. The computer program product of claim 11, wherein the program code includes:
    instructions for disabling an entry corresponding to such a task in said master task list responsive to completion of execution of the task.

13. The computer program product of claim 12, wherein the program code includes:
    instructions for creating a next shadow task list responsive to completing scheduling of all the tasks having entries in the first shadow task list, wherein completed ones of the entries from the master task list are cleared from the next shadow task list.

14. The computer program product of claim 11, wherein the tasks comprise transferring data from one memory unit to another memory unit.

15. The computer program product of claim 11, wherein said tasks represent respective microinstructions, and wherein said master task list represents a plurality of microinstructions which need to be executed to execute a corresponding machine instruction.

* * * * *